W. H. BUTLER.
APPARATUS FOR DISPLAYING UNITS AND QUOTATIONS, NEWS, AND ADVERTISING.
APPLICATION FILED APR. 28, 1919.
1,356,260. Patented Oct. 19, 1920.
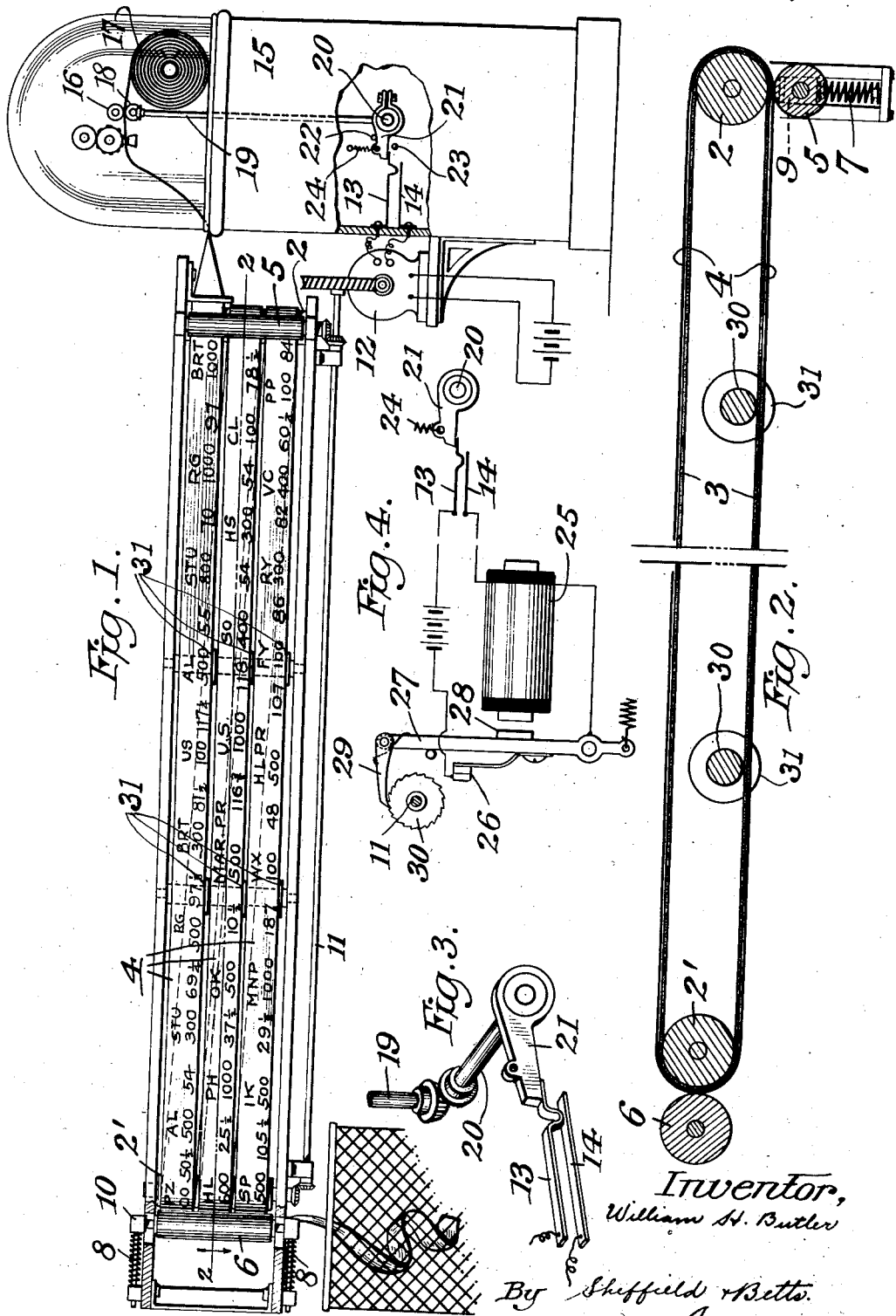
Inventor,
William H. Butler
By Sheffield & Betts.
Attorneys.

UNITED STATES PATENT OFFICE.

WILLIAM HENRY BUTLER, OF NEW YORK, N. Y.

APPARATUS FOR DISPLAYING UNITS AND QUOTATIONS, NEWS, AND ADVERTISING.

1,356,260.   Specification of Letters Patent.   Patented Oct. 19, 1920.

Application filed April 28, 1919. Serial No. 293,366.

*To all whom it may concern:*

Be it known that I, WILLIAM H. BUTLER, a citizen of the United States, and a resident of the city, county, and State of New York, have invented certain new and useful Improvements in Apparatus for Displaying Units and Quotations, News, and Advertising, of which the following is a description.

My invention relates to the display of information, and has as its principal object the provision of means for increasing the utility of the present stock "ticker" mechanism.

The stock "ticker" is widely used, but for mechanical reasons only a few persons can observe the tape at a given time. It is at present attempted to overcome these mechanical limitations by having an operator to call off the prices or quotations only to an assistant as they appear on the tape, the assistant thereupon placing cards in racks to show the quotations. This method requires the services of two or more persons, and is also defective in that the number of units sold does not appear on the cards. This item of information, to wit, the quantities or units, is essential to one who would follow the market intelligently, as an operator cannot determine by quotations alone the trend of the market. He must know the amounts or units sold or purchased to enable him to judge whether to buy or sell. He must also know if he has stock to sell, the quantities offered or sold. In the same way, purchasers need this information in order to be able to judge of the time to sell.

Consequently, a smaller machine with a tape is provided for this purpose, but it is not convenient or feasible for more than a few persons to inspect this tape, and the method is not at all accurate, owing to the pressure of time to which persons are naturally subjected and to inherent defects in the method.

In large or most offices, it is at present necessary to have six or more of these smaller machines in order that operators may see the units, as usually not more than three persons can use the machine at once.

According to my invention, a machine of the "ticker" type is provided, which has a large tape, and the tape is displayed so that it can be read by a large number of persons at once, and it does not require the smaller machine, which it will displace.

Also, according to my invention, a continuous tape is displayed in several lengths so that quotations and the units or quantities or amounts of transactions occurring over a considerable time can be readily seen.

In displaying news—say, election news—it is now the custom to have boards or boardings or canvas sheets on which is displayed the returns or news by stereopticon, the returns or news being first printed or painted. It is also necessary to have one or more attendants at each display.

According to my invention, one telegrapher at the main office can operate such machine or any number of machines from the main office, thus obviating the necessity of manning each place operated, with the attendant expense. Obviously the invention is not limited to displaying election news, but can be used to display information of any kind to groups or crowds of people.

The novel features of my invention are pointed out particularly in the appended claims. The invention itself, however, together with further objects and advantages, will best be understood by reference to the following description taken in connection with the accompanying drawing, in which—

Figure 1 is an elevational view, parts being broken away, of a quotation displaying apparatus embodying my invention;

Fig. 2 is a detail sectional view taken on the line 2—2 of Fig. 1;

Fig. 3 is a detail perspective view of the contact closing mechanism shown in Fig. 1;

Fig. 4 is a detail elevational view of a different form of tape actuating mechanism from that shown in Fig. 1.

In the separate views, the same part is designated by the same reference character.

Referring to the drawing more in detail, 1 is a frame mounted preferably in a vertical plane and in which are journaled two rollers 2—2' with vertical axes around which are stretched endless woven tapes such as 3 for supporting the lengths of paper tape 4, on which the quotations are printed. Rubber-covered pressure rollers 5 are employed to hold the paper tape 4 against the woven tapes 3 tightly against driving roller 2, and a similar pressure roller 6 is used for the same purpose in connection with the roller 2', the pressure rollers 5 and 6 being forced against the rollers 2 and 2' by springs, such as 7 and 8 respectively, which press against journal boxes, such as 9 and 10, in which the pressure rollers are mounted. The paper tape 4 passes between rollers 2 and 5 and thence in a horizontal length until it passes between rollers 2' and 6, from which point it passes in an inclined length indicated in dotted lines, to roller 2 again, from which point the paper tape extends between the rollers in the same manner as just described as many times as desired, three horizontal lengths being shown in Fig. 1.

The rollers 2 and 2' are driven by gearing from a shaft 11, the shaft being turned at proper times by any suitable arrangement, such as a motor 12, which is geared to shaft 11 and is started and stopped by the closing and opening of the gap between contacts 13 and 14. The operation of the contacts 13 and 14 is controlled from the machine 15 in which the tape is printed so that the tape is drawn out by the rollers 2—2' only as fast as it is printed by mechanism 16 in the machine 15. The printing mechanism 16 may be of any suitable type, the ordinary stock ticker printing arrangement being entirely suitable. The tape coming from the roll 17 is fed to the printing mechanism 16 by a pair of rollers, such as 18, and the lower one of said rollers is geared to a shaft 19, the lower end of which is geared to a short shaft 20 on which is frictionally mounted an arm 21, the motion of which is limited by two stops 22 and 23. When the tape is stationary, the contacts 13 and 14 are separated, the arm 21 being held against the upper stop 22 by the spring 24. When, however, the quotations are being received by machine 15 and the tape fed from roll 17 and printed, the lower roller 18 turns shafts 19 and 20 and the arm 21 is rotated downward against stop 23, closing the contacts and causing the motor 12 to feed the tape in the display apparatus until the quotations stop, and the consequent stoppage of the tape and rollers 18 permits the spring 24 to lift arm 21 from contact 13, thus permitting it to separate from contact 14 and stop the motor 12.

Fig. 4 illustrates a modified form of the means for driving shaft 11, comprising an electro-magnet 25, the circuit of which includes the contacts 13 and 14 controlled by arm 21, a battery and a make-and-break device 26, the movable member of which is carried by an arm 27 on which is fixed the armature 28 of the magnet 25. Arm 27 is pivotally mounted, a spring drawing it to move the armature away from the magnet when the circuit of the latter has been interrupted. The arm 27 has a pawl 29 pivoted thereon, which steps the toothed wheel 30 as the arm 27 oscillates, and thus rotates the shaft 11.

In order to prevent the tapes 3 and 4 from slipping down on the rollers 2 and 2' or sagging between these rollers, I provide flanged supporting pulleys, such as 30, which run against the inner faces of the tapes 3 and whose flanges project outwardly as shown at 31, so as to support both tapes 3 and tape 4.

It will be understood that lengths of tape 4 are held by my apparatus at a sufficient height so that the plurality of lengths displayed are visible to persons closely grouped together.

I do not consider that my invention is limited to the display of information received telegraphically or printed automatically, as the displaying mechanism herein disclosed can be used to display tape carrying pictures or information placed thereon by any method whatever.

It will be understood that I have shown and described the preferred embodiment of my invention, but I consider as within the scope of my invention all apparatus mechanically equivalent to that herein disclosed.

Having thus disclosed my invention, I claim:

1. A device for displaying printed matter comprising, in combination, means for printing on a tape and means for displaying the tape printed by said means in a plurality of lengths stretched side by side and connected end to end.

2. A unit and quotation displaying device comprising in combination means for printing units and quotations on a tape, and means for displaying the tape printed by said means in a plurality of lengths stretched side by side, and connected end to end.

3. A unit and quotation displaying device comprising in combination means for printing units and quotations on a tape, means for displaying the tape printed by said means in a plurality of lengths stretched side by side and connected end to end, and flexible means for supporting the non-printed face of said lengths.

4. A device for displaying printed matter comprising, in combination, means for printing on a tape and means for feeding said tape after printing in a plurality of complete helical turns whereby the printing is repeatedly visible.

5. A unit and quotation displaying apparatus comprising means for displaying simultaneously a plurality of lengths of printed tape connected end to end to a number of persons in one group.

6. A unit and quotation displaying apparatus comprising means for displaying a plurality of lengths of printed tape to a number of persons grouped together, and flexible and fixed means for supporting said lengths of tape, said flexible means comprising endless bands bearing against the non-printed face of said tape.

7. A unit and quotation displaying apparatus comprising in combination means for printing a tape, winding and pressure rollers for moving the printed tape in display position, and endless bands running on said winding rollers for assisting in supporting the tape.

8. A unit and quotation displaying apparatus comprising in combination means for printing a tape, and winding and pressure rollers for holding the printed tape in display position, said tape being wound around said winding rollers a plurality of turns passing between said pressure rollers and the winding rollers.

9. A unit and quotation displaying apparatus comprising in combination means for printing a tape, and winding and pressure rollers for holding the printed tape in display position, said tape being wound around said winding rollers a plurality of turns, and continuous supporting bands intermediate said tape and said winding rollers.

10. The combination with means for printing units and quotations on a tape, of means for drawing the tape from the printing means as it is printed and passing it unbroken in a plurality of lengths arranged side by side.

11. A unit and quotation displaying apparatus comprising in combination means for printing a tape, and winding and pressure rollers for moving the printed tape in display position, said pressure rollers coöperating with said winding rollers in moving the tape longitudinally of itself.

12. A unit and quotation displaying apparatus comprising in combination means for printing a tape, and winding and pressure rollers for holding the printed tape in display position, said pressure rollers being arranged parallel to the winding rollers and bearing against the tape, said tape being wound around said winding rollers a plurality of turns spaced in the direction of the axis of the rollers.

WILLIAM HENRY BUTLER.